United States Patent [19]

Ogawa et al.

[11] Patent Number: 4,588,645

[45] Date of Patent: May 13, 1986

[54] RUBBER ARTICLES HAVING AN IMPROVED APPEARANCE

[75] Inventors: Masaki Ogawa; Yasuro Shiomura, both of Kodaira, Japan

[73] Assignee: Bridgestone Corporation, Tokyo, Japan

[21] Appl. No.: 706,415

[22] Filed: Feb. 27, 1985

[30] Foreign Application Priority Data

Feb. 28, 1984 [JP] Japan ................................ 59-35172

[51] Int. Cl.$^4$ .............................................. B32B 9/04
[52] U.S. Cl. .................................... 428/447; 427/387; 427/393.5; 524/588; 528/33; 528/34; 528/901
[58] Field of Search ........................... 528/33, 34, 901; 524/588; 427/387, 393.5; 428/447

[56] References Cited

U.S. PATENT DOCUMENTS

| | | | |
|---|---|---|---|
| 4,244,911 | 1/1981 | Ishizaka et al. | 428/447 |
| 4,399,193 | 8/1983 | Preiner et al. | 428/447 |
| 4,441,946 | 4/1984 | Sharma | 428/447 |
| 4,447,499 | 5/1984 | Swihart et al. | 428/447 |

Primary Examiner—Edith Buffalow
Attorney, Agent, or Firm—Sughrue, Mion, Zinn, Macpeak, and Seas

[57] ABSTRACT

A rubber article having an improved appearance is disclosed, which is provided at its surface with a coating of an organopolysiloxane having a friction coefficient corresponding to 1.2–3.0 times that of the particular non-branched polydimethylsiloxane.

6 Claims, No Drawings

RUBBER ARTICLES HAVING AN IMPROVED APPEARANCE

BACKGROUND OF THE INVENTION

1. Field of the Invention

This invention relates to rubber articles, and more particularly to rubber articles, preferably tires wherein a coating of an organopolysiloxane having a large frictional coefficient is formed on the surface of the rubber article to improve the appearance and remarkably prevent the deterioration of the appearance in long-term storage and retain friction properties of the rubber article surface.

2. Description of the Prior Art

Since diene rubber is generally used in the tire, large amounts of amine series antioxidant and paraffin wax are compounded in the tire for obtaining satisfactory weather resistance. However, these chemicals are apt to cause blooming in a short time, so that the surface of the tire becomes light brown when storing in a tire shop for some time and the appearance is considerably deteriorated.

Although many coating materials are commercially available for solving the above problem, the coating materials having a sufficient effect are few and inversely obstruct the action of the antioxidant or paraffin wax to produce ozone cracks. For this reason, it is proposed to apply a silicone oil containing no low molecular weight component for causing ozone crack to the rubber article. Since the silicone oil is generally very small in the friction coefficient, however, when it is applied to, for example, the tire, slipping is caused between the tire and the rim, so that wheel balance at an initial stage is lost. Particularly, when the silicone oil is applied to the tread portion, if the first use of the tire is a rainy day, there is a fear of causing tire slipping.

SUMMARY OF THE INVENTION

It is an object of the invention to provide rubber articles having an improved appearance and remarkably preventing the deterioration of the appearance in long-term storage and retaining friction properties of the article surface at necessary extents.

According to the invention, there is provided a rubber article having at its surface a coating of an organopolysiloxane, whose frictional coefficient being 1.2 to 3.0 times that of a non-branched polydimethylsiloxane having a volatile loss of 0.1% when heating at 150° C. for 2 hours and a viscosity at 25° C. of 5,000 cst; said frictional coefficient being measured by placing a steel column having a bottom area of 20 cm² and a weight of 100 g on a sample of 0.5 μm in thickness arranged on a polished steel plate and applying a force to the column in a direction parallel with the steel plate and expressed as a value of dividing a force required in the beginning of the column movement by 100 g.

As to the frictional coefficient defined by the above measurement (hereinafter referred to as friction coefficient), the organopolysiloxane according to the invention has a frictional coefficient being 1.2 to 3.0 times that of the polydimethylsiloxane as mentioned above. Hereinafter, a ratio of frictional coefficient of the organopolysiloxane to frictional coefficient of the polydimethylsiloxane will be referred to as a friction coefficient ratio of organopolysiloxane.

The organopolysiloxane according to the invention may be produced, for example, by the conventionally known method as follows.

A dimethyl silicone oil having a volatile loss of less than 0.1%, for example, when heating at 150° C. for 2 hours and a viscosity at 25° C. of 1,500 cst, whose terminal is sealed by a trimethylsilyl group, is reacted with a xylene solution of a starting organopolysiloxane, wherein $(CH_3)_3SiO_{\frac{1}{2}}$ unit is, for example, 0.75 to 1 of $SiO_2$ unit, in the presence of KOH at about 135° C. for about 15 hours. During this reaction, the by-produced water is removed from the system. After KOH is neutralized with $CH_3COOH$ or the like, xylene is removed from the reaction product under a reduced pressure to obtain an organopolysiloxane. In this case, the organopolysiloxane having the frictional coefficient ratio of organopolysiloxane of 1.2–3.0 according to the invention can be obtained by varying the ratio of $(CH_3)_3SiO_{\frac{1}{2}}$ unit to $SiO_2$ unit in the starting organopolysiloxane and the weight ratio of dimethyl silicone oil to starting organopolysiloxane.

The reason why the friction coefficient ratio of organopolysiloxane according to the invention is limited to 1.2–3.0 is based on the followings. When the organopolysiloxane having the frictional coefficient ratio of less than 0.2 is applied to the tire as a rubber article, slipping is caused between the rim and the tire to lose the meaning of taking the wheel balance at an initial stage, and particularly there is a fear of causing tire slipping if the first using time of the tire having the coated tread portion is a rainy day. Furthermore, there is a large possibility that a small amount of the organopolysiloxane adheres to the floor of the factory in the application to the rubber article and consequently the floor is apt to be slippery and dangerous to walk on. On the other hand, the friction coefficient ratio of more than 3.0 is not required in points of the prevention from the slipping of the coated tire on road surface and the like, and also the surface of the rubber article coated with the organopolysiloxane having a friction coefficient ratio of more than 3.0 unfavorably exhibits a slightly whitish appearance.

The organopolysiloxane is preferable to have a volatile loss of less than 2% when heating at 150° C. for 2 hours. When the volatile loss is not less than 2%, a large amount of low molecular weight oligomer becomes substantially existent in the organopolysiloxane, which diffuses and penetrates into the rubber composition to considerably degrade the durability of the rubber article and is apt to produce ozone cracks or small cracks very similar to the ozone crack. More preferably, the volatile loss is not more than 1%.

When the viscosity at 25° C. of the organopolysiloxane is less than 200 cst, this organopolysiloxane is apt to adhere to hand or others in the transportation of the rubber article, so that the viscosity is preferable to be not less than 200 cst. However, the organopolysiloxane according to the invention is difficult to cause adhesion as compared with the conventional non-branched polydimethylsiloxane.

The coating thickness of the organopolysiloxane is preferably in the range of 5–30 μm. When the coating thickness is less than 5 μm, not only the effect of improving the appearance of the tire but also the effect of retaining the appearance of the tire in long-term storage are insufficient, while when the coating thickness exceeds 30 μm, the appearance is undesirably shined.

Preferably, the coating thickness is 7–20 μm for more improving the above.

The application of the organopolysiloxane may be carried out by any of usual methods. For instance, the organopolysiloxane can be applied directly, or in the form of solution or suspension, or by brushing, spraying or other suitable method. Particularly, when an O/W type emulsion obtained by emulsifying the organopolysiloxane together with an emulsifying agent in water is applied to the rubber article, the uniformity of the coating thickness is easily retained and further there is caused no generation of harmful vapor of organic solvent.

Moreover, this emulsion favorably contained 0.05–5 parts by weight of mica based on 100 parts by weight of the organopolysiloxane. Because, the addition of not less than 0.05 part by weight of mica improves the touch on the organopolysiloxane coating, while the addition of more than 5 parts by weight of mica forms a whitish coating and rather deteriorates the appearance thereof. As the mica, use may preferably be made of the following fluorine micas:

$$NaMg_{2.5}Si_4O_{10}F_2$$

$$(Na,Li)Mg_2Li(Si_4O_{10})F_2, \text{ and}$$

$$(Na,Li)_{\frac{1}{3}}Mg_{2\frac{2}{3}}Li_{\frac{1}{3}}(Si_4O_{10})F_2$$

The following examples are given in illustration of the invention and are not intended to limitations thereof.

EXAMPLES 1–3, COMPARATIVE EXAMPLES 1–3

Into a mixing and heating reaction vessel of 20 l capacity provided with a thermometer, a cooler and a dissolvent means were charged 2 kg of dimethyl silicone oil having a volatile loss of 0.1% when heating at 150° C. for 2 hours and a viscosity at 25° C. of 1,500 cst, whose terminal being sealed with trimethylsilyl group, 1.4 kg of xylene solution of 50% by weight of a starting organopolysiloxane having a ratio of $(CH_3)_3SiO_{\frac{1}{2}}$ unit to $SiO_2$ unit of 0.75, 2 kg of xylene and 0.001 kg of KOH and then the resulting mixture was heated at 135° C. for 15 hours, during which the by-produced water was removed off from the vessel. After KOH was neutralized with $CH_3COOH$, xylene was removed off under a reduced pressure and then vacuum distillation was performed at 150° C. to obtain an organopolysiloxane having a volatile loss of about 0.1% when heating at 150° C. for 2 hours.

The thus obtained organopolysiloxane was a colorless and transparent liquid having a viscosity at 25° C. of 2,300 cst and the yield thereof was 2.6 kg (Sample No. 4).

The above procedure was repeated by varying the ratio of $(CH_3)_3SiO_{\frac{1}{2}}$ unit to $SiO_2$ unit and/or the weight ratio of dimethyl silicone oil sealed at terminal with trimethylsilyl group to starting organopolysiloxane to obtain organopolysiloxanes of Sample Nos. 2, 3, 5 and 6.

A 5% mineral spirit solution of each of the organopolysiloxanes of Sample Nos. 1–6 was applied by spraying to a surface of a tire having a size of 165 SR 13. Moreover, Sample No. 1 was a non-branched polydimethylsiloxane used as a control for the frictional coefficient ratio as shown in the following Table 1.

For the coated tire, the appearance was visually evaluated and the coating thickness and the braking performance at a wet state were measured by the following methods.

Coating thickness:

A specimen was cut out from the tire coated with the organopolysiloxane and its coating thickness was measured by means of JSR-T 200 type scanning microscope made by JEOL, Ltd.

Braking performance at wet state:

A passenger car of 1,600 cc in displacement provided with four test tires was run on a wet road having a water depth of 1.2 mm at a speed of 60 km/hr and thereafter subjected to rapid braking at the above speed. Then, a running distance required for completely stopping the car was measured, from which the braking peformance at wet state was evaluated according to the following equation:

$$\frac{\text{Running distance of test tire}}{\text{Running distance of control tire}} \times 100$$

wherein the control tire is a tire not coated with the organopolysiloxane.

The viscosity, volatile loss and frictional coefficient ratio of the organopolysiloxane and the evaluation results are shown in Table 1.

TABLE 1

| | Comparative Example 1 | Comparative Example 2 | Example 1 | Example 2 | Example 3 | Comparative Example 3 |
|---|---|---|---|---|---|---|
| Sample No. of organopolysiloxane | 1*[1] | 2 | 3 | 4 | 5 | 6 |
| Viscosity (25° C.) cst | 5000 | 2500 | 2150 | 2300 | 2250 | 2450 |
| Volatile loss under conditions of 150° C. × 2 hours | 0.1% | 0.1% | 0.1% | 0.1% | 0.1% | 0.1% |
| Friction coefficient ratio | 1.0 (control) | 1.15 | 1.25 | 1.85 | 2.75 | 3.05 |
| Coating thickness (μm) | 15 | 15 | 15 | 15 | 15 | 15 |
| Tire appearance | excellent | excellent | excellent | excellent | good | bad |
| Braking performance at wet state | 76 | 90 | 95 | 99 | 100 | 100 |

[1]Non-branched polydimethylsiloxane (control for friction coefficient ratio)

As shown in Examples 1 to 3, when the frictional coefficient ratio is 1.2–3.0, the tire appearance is excellent or good and the braking performance at wet state is good, but when the frictional coefficient ratio is outside the above range, one of the above properties comes into problem.

EXAMPLES 4–9

This example shows that the coating thickness is preferable within a range of 5–30 μm.

To 20 parts of the organopolysiloxane of Sample No. 4 were added 3 parts of (polyoxyethylene)nonylphenyl ether and 80 parts of water, which was emulsified with an emulsifying agent to form an O/W type emulsion. This emulsion was diluted with water twice to form a diluted emulsion as Sample No. 7, which was sprayed onto a tire (165 SR 13). Then, the coating thickness and tire appearance were measured in the same method as in Examples 1 to 3 together with an effect of retaining the appearance in long-term storage to obtain results as shown in the following Table 2.

TABLE 2

|  | Example 4 | Example 5 | Example 6 | Example 7 | Example 8 | Example 9 |
|---|---|---|---|---|---|---|
| Coating thickness ($\mu$m) | 3 | 5 | 7 | 18 | 25 | 32 |
| Tire appearance | passable | good | excellent | excellent | good, slightly shinning | shinning |
| Tire appearance after storage for 4 months | color change | good | excellent | excellent | excellent | shinning |

The thus obtained results are shown in the following Table 3.

TABLE 3

|  | Example 10 | Example 11 |
|---|---|---|
| Sample No. of organopolysiloxane | 8 | 9 |
| Coating thickness ($\mu$m) | 10 | 10 |
| Ozone test | none | presence |
| Ozone drum test | none | presence |
| Appearance | excellent | excellent |
| Appearance after storage for 4 months | excellent | excellent |

EXAMPLES 10-11

This example shows that the volatile loss of the organopolysiloxane under conditions of 150° C. ×2 hours is preferably less than 2%.

Two emulsion-type coating materials were prepared as Sample Nos. 8 and 9 by using dimethyl silicone oil sealed at terminal with trimethylsilyl group and having a volatile loss of 1.3% or 2.4% under conditions of 150° C.×2 hours in the same method as in the production of the organopolysiloxane of Sample No. 4, which were sprayed at a coating thickness of 10 $\mu$m to tires (165 SR 13) in the same manner as in Examples 4 to 9, respectively.

As regards the thus coated tires, the coating thickness and the appearance were measured in the same method as in Examples 1 to 3, and the ozone test and ozone drum test were made as follows.

Ozone test:

A sliced sheet of 0.5 mm in thickness was cut out from the sidewall of the tire and tested according to a method of JIS K-6301 under the following conditions to observe the presence of cracks.
 ozone concentration—50 pphm
 strain—30%

Ozone drum test:

After the tire was run on a drum at an ozone concentration of 10 pphm over a distance of 20,000 km, the surface state (presence or absence of cracks) was observed.
 internal pressure—1.7 kg/cm$^2$
 load JIS—100% load
 speed—50 km/hr

EXAMPLES 12-15

This example shows that the viscosity at 25° C. of the organopolysiloxane is preferable to be not less than 200 cst.

The organopolysiloxanes having different viscosities as shown in the following Table 4 were sprayed to the tires in the same method as in Examples 4-9, respectively.

The organopolysiloxane is apt to be peeled off from the tire by rubbing with the other matter when the viscosity is low (or the molecular weight is low). Therefore, the peeled quantity was evaluated by wiping the coating surface with a cotton cloth 10 times. The thus obtained results are shown in Table 4.

TABLE 4

|  | Viscosity at 25° C. of organopolysiloxane (cst) | Volatile loss under conditions of 150° C. × 2 hours (%) | Coating thickness of organopolysiloxane at initial stage ($\mu$m) | Coating thickness of organopolysiloxane after the test ($\mu$m) |
|---|---|---|---|---|
| Example 12 | 190 | 0.5 | 25 | 4 |
| Example 13 | 240 | 0.4 | 24 | 12 |
| Example 14 | 2000 | 0.5 | 25 | 18 |
| Example 15 | 5000 | 0.5 | 24 | 18 |

EXAMPLES 16-19

This example shows that the organopolysiloxane emulsion is preferable to contain a fluorine mica.

To the emulsion of Sample No. 7 was added each of the following fluorine mica, which was sprayed to the tire (165 SR 13) in the same method as in Examples 4-9. The thus obtained results are shown in the following Table 5.

| Kind of fluorine mica | Amount per 100 parts by weight of organopolysiloxane (part by weight) |
|---|---|
| Example 16  NaMg$_{2.5}$Si$_4$O$_{10}$F$_2$ | 0.03 |

-continued

| | Kind of fluorine mica | Amount per 100 parts by weight of organopolysiloxane (part by weight) |
|---|---|---|
| Example 17 | $NaMg_{2.5}Si_4O_{10}F_2$ | 0.05 |
| Example 18 | $(Na,Li)Mg_2Li(Si_4O_{10})F_2$ | 1.0 |
| Example 19 | $(Na,Li)Mg_2Li(Si_4O_{10})F_2$ | 4.5 |

TABLE 5

| | Tire appearance | Feeling test | Coating thickness of organopolysiloxane ($\mu$m) |
|---|---|---|---|
| Example 16 | excellent | slightly sticky | 25 |
| Example 17 | excellent | excellent | 25 |
| Example 18 | excellent | excellent | 23 |
| Example 19 | slightly whitish | excellent | 26 |

As apparent from the above, according to the invention, the rubber articles coated with the organopolysiloxane having a frictional coefficient ratio of 1.2–3.0 have an improved appearance and remarkably prevent the deterioration of the appearance even in long-term storge. Further, the frictional coefficient of the rubber article surface is considerably improved as compared with the case of coating with the conventional non-branched polydimethylsiloxane. For instance, when the organopolysiloxane according to the invention is applied to tires, the braking performance at wet state in the original use is considerably enhanced as compared with the case of using the polydimethylsiloxane and is sufficient from a viewpoint of the tire safety.

What is claimed is:

1. A rubber article having at its surface a coating of an organopolysiloxane, whose friction coefficient being 1.2 to 3.0 times that of a non-branched polydimethylsiloxane having a volatile loss of 0.1% when heating at 150° C. for 2 hours and a viscosity at 25° C. of 5,000 cst; said friction coefficient being measured by placing a steel column having a bottom area of 20 cm$^2$ and a weight of 100 g on a sample of 0.5 $\mu$m in thickness arranged on a polished steel plate and applying a force to the column in a direction parallel with the steel plate and expressed as a value of dividing a force required in the beginning of the column movement by 100 g.

2. The rubber article according to claim 1, wherein said organopolysiloxane has a volatile loss of less than 2% when heating at 150° C. for 2 hours.

3. The rubber article according to claim 1, wherein said organopolysiloxane has a viscosity of 25° C. of not less than 200 cst.

4. The rubber article according to claim 1, wherein said organopolysiloxane is uniformly applied at a thickness of 5–30 $\mu$m.

5. The rubber article according to claim 1, wherein said organopolysiloxane is applied in the form of O/W type emulsion.

6. The rubber article according to claim 5, wherein said emulsion contains 0.05–5 parts by weight of mica based on 100 parts by weight of said organopolysiloxane.

* * * * *